United States Patent [19]

Etherington et al.

[11] Patent Number: 4,994,530
[45] Date of Patent: Feb. 19, 1991

[54] POLYMERIC COMPOUNDS

[75] Inventors: Terence Etherington, Leeds; Victor Kolodziejczyk, Bradford, both of United Kingdom

[73] Assignee: E. I. Du Pont de Nemours and Company (Inc.), Wilmington, Del.

[21] Appl. No.: 440,674

[22] Filed: Nov. 22, 1989

[30] Foreign Application Priority Data

Nov. 29, 1988 [GB] United Kingdom ............ 8827812

[51] Int. Cl.$^5$ .................. C08G 85/00; G03C 1/52
[52] U.S. Cl. ........................ 525/386; 525/327.3; 525/328.8; 525/330.5; 525/528; 525/533; 526/287; 526/301; 526/318; 430/170; 430/175; 430/176; 430/270
[58] Field of Search ............ 525/327.3, 328.8, 330.5, 525/386, 528, 533; 526/301, 318, 287; 430/170, 176, 270, 175

[56] References Cited

U.S. PATENT DOCUMENTS

| | | | |
|---|---|---|---|
| 4,429,096 | 1/1984 | Schaefer | 526/301 |
| 4,732,951 | 3/1988 | Ahne | 525/528 |
| 4,845,009 | 7/1989 | Kita | 430/176 |
| 4,931,379 | 6/1990 | Brunsvold | 430/176 |

Primary Examiner—Paul R. Michl
Assistant Examiner—Christopher G. Young
Attorney, Agent, or Firm—Harness, Dickey & Pierce

[57] ABSTRACT

Polymeric compounds comprise groups of the formula

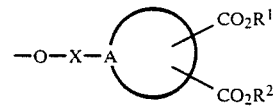

attached to carbon atoms of a polymer containing hydroxyl and optionally epoxide groups wherein X is

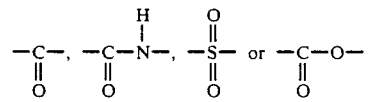

The compounds are produced by reacting a starting polymer, which contains hydroxy groups and optionally epoxide groups with a reagent containing a cyclic anhydride group and a further functional group capable of reacting with the hydroxyl (and/or epoxide) groups preferentially to the anhydride group. The compounds are useful as bakeable support resins for radiation sensitive compounds in the production of printing plates.

12 Claims, No Drawings

POLYMERIC COMPOUNDS

This invention relates to novel polymeric compounds and more particularly, but not exclusively, is concerned with such compounds for use in radiation-sensitive compositions for printing plate or photoresist production.

In use, whether for printing plate or photoresist production, radiation-sensitive compositions are coated on to a suitable substrate to form a radiation sensitive plate. The coating is then image-wise exposed to radiation so that parts of the coating are struck by the radiation and parts are not. The radiation-struck and non-radiation struck parts have differing solubilities in developer liquids and thus the more soluble parts can be selectively removed by application of such a liquid to leave an image on the substrate constituted by the less soluble parts.

As is well known, radiation-sensitive compounds are considered to be either positive-working or negative-working depending upon whether the effect of the radiation is to increase or decrease the solubility of the compounds. Positive-working compounds are commonly based on quinone-diazides and negative-working compounds are commonly based on photocrosslinkable compounds (e.g. cinnamates), photopolymerisable compounds (e.g. (meth)acrylates) or diazo compounds (e.g. the so-called diazo resins).

Currently, the negative-working compositions most widely used for lithographic printing plates are based on diazo compounds in conjunction with a suitable binder or support resin.

Such compositions have reasonable sensitivity to radiation and can be developed with aqueous-based solutions, unlike compositions based on photocrosslinkable compounds which require a solvent-based developer. However, their toughness (which affects the number of prints that can be obtained from a printing plate) is substantially less and moreover, unlike other negative-working compositions and positive-working compositions based on quinone-diazides, they do not have the capability, after exposure and development, of being baked (i.e. heated to temperatures of 180° C. and above for a period of a few minutes as described in GB Patent Specification No. 1513368) to increase their toughness.

It is an object of the present invention to provide a polymeric compound which is usable as a binder or support resin for a radiation-sensitive compound in a radiation-sensitive composition and which when baked increases the toughness of the composition. Such polymeric compounds will hereinafter be referred to as bakeable polymers.

According to one aspect of the present invention, there is provided, a bakeable polymer comprising groups of the formula

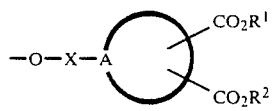

attached to carbon atoms which are part of the backbone of a polymer containing hydroxyl and optionally epoxide groups where, X is

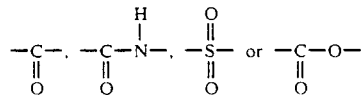

A is a moiety made up of sufficient carbon atoms to form a ring or fused ring system, and $R^1$ and $R^2$ are H or lower alkyl, provided that at least one of $R^1$ and $R^2$ is H, the groups containing $R^1$ and $R^2$ being oriented relative to one another on the ring system such that intramolecular anhydride formation can occur through heating.

The mechanism or chemical process which gives rise to the improvement on baking is unknown but it may be postulated to occur through two possible routes of which both or either may occur.

In the first route, the groups containing $R^1$ and $R^2$, cyclise upon heating to form an intramolecular (cyclic) anhydride. This anhydride will then very rapidly react with any available hydroxyl or other suitable functional groups. The conditions of the baking process are such that the bulk of these groups will be provided by the backbone polymer and the product so produced will, therefore, be a crosslinked polymer.

In the second route, an intermolecular anhydride could form which gives rise directly to a crosslinked system. This intermolecular anhydride could also further react with hydroxyl groups present in the backbone polymer but, of course, no further crosslinking would occur as the initial inter-polymer link would perforce be broken during this reaction.

What is known, is that for effective crosslinking to occur, groups containing $R^1$ and $R^2$ must be oriented relative to one another on the ring system such that intramolecular (cyclic) anhydride formation could occur through heating. Thus, for example, in the case of A being a benzene or alicyclic ring system, the groups containing $R^1$ and $R^2$ must be adjacent each other whilst in the case of A being a naphthalene ring system the groups could also be located peri to each other.

The polymer containing hydroxyl, and optionally epoxide, groups (hereinafter referred to as the "polymeric material") may be, for example:

1. Poly (vinyl acetate) or a copolymer of vinyl acetate with another vinyl monomer and which has been at least partially saponified, or esters or acetal derivatives of such saponified materials. Examples of such polymers are poly (vinyl alcohols) having between 80% and 100% (by weight) vinyl alcohol units and molecular weights of approximately 50,000 and poly (vinyl butyrals) and other poly (vinyl acetals) having at least 5% by weight of vinyl alcohol units and molecular weights in the range 20,000 to 80,000.

2. An epoxy resin which is the condensation product of epichlorhydrin with an aromatic hydroxy compound such as bisphenol A and which has a molecular weight in the range of 900 to 5000.

3. A poly (meth) acrylate ester and in particular one derived from 2-hydroxy propyl methacrylate or 2-hydroxy ethyl methacrylate.

4. A copolymer containing free hydroxyl groups such as a styrene-allyl alcohol copolymer.

5. A novolak resin which is the condensation product of a phenol or cresol with formaldehyde.

6. A polymer derived from a vinyl phenol.

Optionally, the polymeric material may also contain ester groups derived from aliphatic or aromatic carboxylic acids such as octanoic acid, lauric acid or benzoic acid.

According to a further aspect of the present invention, there is provided a process for the production of a bakeable polymer which comprises (i) providing a polymer containing a plurality of hydroxyl and optionally epoxide groups, (ii) reacting some of the hydroxyl groups (and/or epoxide groups if present) with a reagent containing both a cyclic anhydride group and a further functional group, which further functional group is capable of reacting with said hydroxyl groups (and/or epoxide groups if present) preferentially relative to the anhydride group, and (iii) changing the anhydride groups in a conversion step to carboxylic acid groups or to a carboxylic acid group and an ester group.

The further functional group may be an isocyanate, a carboxylic acid or suitable derivative thereof, a sulphonic acid or suitable derivative thereof or a chloroformate.

Particular reagents containing such a further functional group are:
3-isocyanato phthalic acid anhydride;
4-isocyanato phthalic acid anhydride;
trimellitic acid anhydride chloride;
4-chlorosulphonyl 1,8, naphthalic acid anhydride; and
the Diels-Alder reaction product of sorbic acid and maleic acId anhydride.

The conversion step eliminates premature crosslinking and may be carried out by adding water or a primary alcohol to the reaction mixture. The use of the alcohol does, of course, produce an ester group which confers additional oleophilicity to the polymer in the unbaked state.

According to a further aspect of the invention, there is provided a radiation-sensitive composition comprising a radiation-sensitive compound and a bakeable polymer as defined above.

Whilst any radiation-sensitive compound may be used in the composition, a diazo compound is particularlY suitable because, as has been mentioned above, baking aiter exposure and development has no effect on such compounds when used conventionally.

Suitable diazo compounds are those such as are described in European Patent Specification No.30862, those described in GB Patent Specifications Nos.1312925 and 1312926 and those produced by the condensation of 4-diazonium diphenylamine salts with formaldehyde i.e. conventional diazo resins.

The invention, as has already been stated, is not limited to the use of radiation sensitive compositions based solely on diazo resins. Indeed performance advantages are also observed, for example, for light sensitive formulations based on oligomeric acrylates and/or combinations of oligomeric acrylates and diazo resins.

In the following examples which illustrate the invention, Examples 1-9 describe the preparation of various bakeable polymers, Example 10 describes the deleterious effect of allowing the anhydride function 25 to react in the absence of the conversion step, whilst Example 11 describes one, prior art, unbakeable polymer. Examples 12-20 describe the use of such polymers in lithographic printing plate production.

EXAMPLE 1

22 g of a polyvinyl butyral having a molecular weight of 30,000 to 34,000 and comprising approximately 80% vinyl butyral units, up to 2% vinYl acetate units and the remainder vinyl alcohol units, were dissolved in 150 cm$^3$ N-methyl-2-pyrrolidone (NMP) and cooled to $-10°$ C. 7.5 g pyridine were then added followed by 17 g trimellitic anhydride chloride dissolved in 50 cm$^3$ cold NMP. The acid chloride addition was carried out dropwise at such a rate as to keep the temperature in the range $-10°$ C. to $0°$ C. After completing the addition, the stirred reaction mixture was kept at $-5°$ C. to $0°$ C. and under anhydrous conditions for a further 16 hours. 15 g of water were then added to the reaction mixture, keeping the temperature in the range $0°$ C. to $+10°$ C., and this mixture was allowed to warm to ambient temperature over six hours. The mixture was then heated to $45°$ C. and held at $45°$ C. for a further 18 hours. The product was isolated by drowning out into water to give a white fibrous precipitate which was filtered, thoroughly, water-washed in a commercial food processor, filtered again and finally dried in a hot air oven at $32°$ C.

The product which weighed 25 g was readily soluble in tetrahydrofuran (THF) and titration of the THF solution with 0.1 M aqueous NaOH gave an acid value of 120. Analysis by gas phase chromatography (gpc) showed a smooth molecular weight (mw) profile with no evidence of crosslinking.

EXAMPLE 2

In a similar manner to that of Example 1, reaction was effected between a polyvinyl butyral containing 71% vinyl butyral units, 2% vinyl acetate units and 27% vinyl alcohol units, and 4-chlorosulphonyl-1,8-naphthalic anhydride. 20 g of the polymeric material, 30 g of the anhydride and 8 g of pyridine were reacted together in 150 cm3 acetonitrile, at a temperature of $0°$ C. for eight hours. After the addition of 15 g water at $0°$ C., the reaction was continued for a further 16 hours at $20°$ C. and then for 12 hours at $45°$ C. Isolation as in Example 1 gave 27 g of a product having an acid value of 162. The product was readily soluble in THF, and demonstrated a smooth mw profile on gpc analYsis.

EXAMPLE 3

The first stage of Example 1 was repeated but after the reaction between the acid chloride and the polymer had been completed (i.e. 16 hours at $0°$ C.), 50 cm$^3$ of methanol were added to the reaction mixture, keeping the temperature in the range $0°$ C. to $+10°$ C. during the addition. The temperature was then raised to $40°$ C. over one hour and held at $40°$ C. for a further six hours. Isolation was achieved by drowning out the reaction solution into 2 liters of water, to give a coarse fibrous white precipitate. Further processing as before gave 25 g of a product having an acid value of 73.

The product was again readily soluble in THF and analysis by gpc showed a smooth, non-crosslinked, mw profile.

EXAMpLE 3A

In a similar manner. solketal (2,2-dimethyl-1,3-dioxolane-4-methanol) (50 cm3) was used in place of methanol. The product was isolated into a mixture of 150 isopropylalcohol (IPA) and water (1:4), and had an acid value of 65.

EXAMPLE 4

22 g of the polyvinyl butyral used in Example 1, was dissolved in 150 cm$^3$ of NMP at 40–50° C. Pyridine (8 cm³) was added followed by lauroyl chloride (16 cm³) and the reaction was stirred under anhydrous conditions and at a temperature of 50° C., for four hours. This mixture was then cooled to −10° C. and a further aliquot of pyridine (8 cm³) was introduced, followed by trimellitic anhydride chloride (15 g) dissolved in NMP (10 cm³). The reaction was continued at −5° C. for 24 hours after which time water (20 g) and NMP (20 cm³) were added dropwise, keeping the temperature below 0° C. The reaction mixture was held at 0° C. for two hours, then at 20° C. For a further four hours and then at 45° C. for a further 12 hours. Isolation was achieved by drowning out the hazy reaction solution into 2 litres of a mixture of water (4 parts by volume) and isopropanol (1 part by volume) the solid from which was then filtered water washed in a food processor, filtered, and dried at 32° C. in a hot air oven. The product, which was obtained as a fine, white, slightly waxy solid, was readily soluble in THF, had an acid value of 104 and showed a smooth mw profile on analysis by gpc.

EXAMPLE 5

30 g of styrene/allyl alcohol copolymer containing 5.5% to 6.0% by weight hydroxyl units and having a molecular weight of 2500 was dissolved in 200 cm³ of THF at room temperature. A catalyst in the form of dibutyl tin di laurate (0.1 8) was added followed by 10 g of 4-isocyanato phthalic anhydride (obtained by Curtius rearrangement of the carbonyl azide derived from trimellitic anhydride chloride; H. Ulrich, R. Richter, J. Org. Chem. 38(14), 2557-8, 1973). The mildly exothermic reaction was held at 20° C. for six hours during which time all the isocyanate (as determined by IR spectroscopy) had reacted. A mixture of water (20 cm³) and THF (20 cm³) was then added and the reaction was left a further four hours at 20° C. before warming to 50° C. for 12 hours. The product was isolated as before into IPA/water (2 litres of a 1:4 mixture). The washed and dried product weighed 36 g and had an acid value of 118. Analysis by gpc showed a smooth mw profile and the dried product readily redissolved in THF.

Measurement of the anhydride content of the reaction mixture by quantitative IR showed that the anhydride function did not decrease significantly prior to addition of the water. Addition of water resulted in a complete loss of the anhydride function.

EXAMPLE 6

21.6 g of cresol-novolak resin were dissolved in 100 cm³ NMP and cooled to −10° C. 13.1 g pyridine were then added, followed by 31.6 g trimellitic anhydriede chloride dissolved in 100 cm³ cold NMP. The acid chloride was added dropwise at such a rate as to keep the temperature in the range −5° C. to 0° C. After completing the addition, the sirred reaction mixture was kept at −2° C. to +2° C. and under anhydrous conditions for a further 16 hours. 20 g of methanol were then added to the reaction mixture, keeping the temperature in the range of 0° C. to +10° C., and this mixture was then allowed to warm to ambient over six hours. The reaction mixture was then heated to 45° C. and held at 45° C. for a further 18 hours. The product was isolated by drowning out into water to give a white fibrous precipitate which was filtered, thoroughly water washed in a commercial food processor, filtered again and finally dried in a hot air oven at 32° C.

The product which weighed 22 g was readily soluble in THF and was found to have an acid value of 93.

EXAMPLE 7

20 g of an epoxy resin obtained by condensing epichlorhydrin and bisphenol A and having a molecular weight of 1400 were dissolved in 100 cm³ NMP and cooled to −10 ° C. 7.2 g pyridine were then added, followed by 17.3 g trimellitic anhydride chloride dissolved in 50 cm³ cold NMPI. The acid chloride solution was added dropwise at such a rate as to keep the temperature in the range −10° C. to 0° C. After completing the addition, the stirred reaction mixture was kept at −5° C. to 0° C. and under anhydrous conditions for a further 16 hours. 15 g of water were then added to the reaction mixture, keeping the temperature in the range 0° C. to +10° C. and this mixture was then allowed to warm to ambient over six hours. The reaction mixture was then heated to 45° C. and held at 45° C. for a further 18 hours. lhe product was isolated by drowning out into water to give a white fibrous precipitate which was filtered, thoroughly water washed in a commercial food processor, filtered again and finally dried in a hot air oven at 32° C.

The product which weighed 22 g was readily soluble in THF and was found to have an acid value of 180.

EXAMPLE 8

After evaporation of xylene/butyl acetate dilution solvent, 25 g of Macrynal SM548, a hydroxy acrylic copolymer of hydroxy value 66, were dissolved in 200 cm³ THF at room temperature. A catalyst in the form of dibutyl tin dilaurate (0.1 g) was added, followed by 5.6 g 4-isocyanato phthalic anhydride. The mildly exothermic reaction was held at 20° C. for six hours during which time all the isocyanate (as determined by IR spectroscopy) had reacted. 20cm³ methanol were then added and the reaction mixture was left a further four hours at 20° C. before warming to 50° C. for 12 hours. The product was isolated as in Example 4 into IPA/water (2 liters of a 1:4 mixture). The washed and dried product weighed 28g and had an acid value of 43. Analysis by gpc showed a smooth mw profile and the dried product readily redissolved in THF.

EXAMPLE 9

25 g of DP6-3095, a hydroxy acrylic polymer obtained from Allied Colloids with a hydroxy value of 155, were dissolved in 200 cm³ acetonitrile and cooled to 0° C. 5.5 g of pyridine were then added followed by 18.6 g of 4-chlorosulphonyl-1,8-naphthalic anhydride dissolved in 50 cm³ cold acetonitrile. The acid chloride addition was carried out dropwise at such a rate as to keep the temperature in the range −2° C. to 0° C. After completing the addition, the stirred reaction mixture was kept at −2° C. to 0° C. for eight hours. 20 g of water were then added to the reaction mixture, keeping the temperature in the range 0° C. to +10° C. and this mixture was allowed to warm to ambient over six hours. The reaction mixture was then heated to 45° C. and held at 45° C. for a further 18 hours.

Isolation, as in Example 1, gave 29 g of a product having an acid value of 190. The product was readily soluble in THF, and demonstrated a smooth mw profile on gpc analysis.

EXAMPLE 10

Example 5 was repeated but no water was added at the end of the isocyanate reaction. The reaction was again held at 20° C. for four hours and for a further 121 hours at 50° C. The slightly gelatinous reaction mixture was isolated as before but this time the dried product would not fully redissolve in THF indicating that considerable crosslinking had taken place. In addition analysis by gpc of the soluble material showed an uneven profile with a high molecular weight (excluded) portion.

EXAMPLE 11

Comparative Example 20 g of the polyvinylbutyral used in Example 2 were dissolved in 200 cm$^3$ NMP at 70° C. 1.2 g of sodium carbonate were added followed by 14.8 g of trimellitic acid anhydride. The reaction mixture was warmed to 100° C. for four hours before cooling and isolating into 2 liters of water. The solid product was filtered thoroughly, water washed in a commercial food processor and re-filtered before drying at 40° C. in a hot air oven.

The product, a white fibrous powder, was readily soluble in THF, showed a smooth mw profile by gpc analysis and had an acid value of 110. The yield amounted to 21 g.

EXAMPLE 12

A coating solution was prepared having the following composition:

8 parts by weight (pbw) of a diazo compound as described in Example 1 of EP-A—0 030 862,
16 pbw of the polymer produced in Example 1,
0.8 pbw of Victoria Pure Blue BO dye,
0.6 pbw of 85% phosphoric acid, and
1000 pbw of Ethylene glycol monomethyl ether After filtering to remove any solids, the solution was whirler coated onto a sheet of electrochemically grained and anodised aluminium to give a dry coating weight of 0.82 gm$^{-2}$. The resultant radiation sensitive plate was exposed through a continuous tone Stouffer step-wedge to ultra violet light in a Berkey-Ascor printing down frame and developed with an aqueous solution containing sodium propionate, sodium benzoate and a surfactant. The developed image of the so produced lithographic printing plate had a step-wedge reading of solid 4 tail 9. After gumming, this plate was fitted to a rotary web offset press and found to Produce 150,000 acceptable impressions after which the step-wedge had lost nearly 2 full steps.

A printing plate prepared and developed under the same conditions was further treated by baking at 200° C. for 10 minutes in accordance with the treatment described in GB 1513368. When used on a rotary web offset press, 230,000 8good impressions were obtained with a loss of only 1 full step on the step-wedge reading.

EXAMPLE 13

A coating solution was prepared as in Example 12, but using 16 pbw of the polymer produced in Example 2. Development, exposure (and baking as appropriate) were effected in a likewise manner to give a finished printing plate which gave 130,000 good copies on a rotary web offset press without baking and 200,000 good copies with baking, i.e. the run length of the printing plate was increased by about 50% through the baking process.

EXAMPLE 14

A coating solution having the following composition was prepared:

35 pbw of the polymer prepared in Example 4,
10 pbw of a diazonium salt condensation product which was the reaction product of 4-diazonium diphenylamine and formaldehyde and obtained as the 2-hydroxy—4-methoxy benzophenone-5-sulphonic acid salt,
2 pbw 85% phosphoric acid,
1.5 pbw of Victoria Pure Blue BO dye, and
2000 pbw of Ethylene glycol monomethyl ether.

The filtered solution was applied to an aluminium sheet as in Example 12 to give a dry coating weight of 0.93 gm $^{-2}$. After treatment as in Example 12 (exposure, development and baking as appropriate) printing plates were obtained which showed excellent ink receptivity during a proof test. When used on a rotary web offset press, 160,000 good impressions were obtained, which increased by 40% with baking.

EXAMPLE 15

A coating solution having the following composition was prepared:

35 pbw of the polymer prepared in Example 3A,
10 pbw of a diazo compound as described in Example 1 of EP-A-0 030 862,
2 pbw of 85% phosphoric acid,
11.5 pbw of Victoria Pure Blue BO dye, and
2000 pbw of Ethylene glycol monomethyl ether After filtering, the solution was whirler coated onto an aluminium substrate which had been electrochemically grained and anodised and further treated with an aqueous solution of polyvinyl phosphonic acid before drying and the application of the radiation sensitive coating. After exposure as in Example 12, development was achieved by treating the plate with an aqueous solution of a surfactant containing 7% benzyl alcohol. Development was very rapid to give a step-wedge reading, after inking-in, of solid 5 tail 9. This rapid development was maintained even for plates which had been subjected to rapid ageing by being stored at 30° C. and 90% relative humidity in a cabinet for five-weeks.

When used on a rotary web offset press, these plates were found capable of producing up to 150,000 good clean impressions. Plates which had been baked, according to the previously mentioned process, were found to have an increased performance such that up to 200,000 copies could be obtained.

EXAMPLE 16

A coating solution was prepared having the following composition:

12 pbw of the polymer produced in Example 5,
12 pbw of a diazonium salt condensation product which was the reaction product of 4-diazonium diphenylamine and formaldehyde and obtained as the 2-hydroxy-4-methoxy benzophenone-5sulphonic acid salt,
1 pbw of Victoria Pure Blue BO dye,
1 pbw of 85% phosphoric acid, and
1000 pbw of Ethylene glycol monomethyl ether The filtered solution was applied to an aluminium sheet as in Example 12 to give a dry coating weight of 0.87 gm$^{-2}$. After treatment as in Example 12 (exposure, development and baking as appropriate) printing plates were obtained. When used on a rotary web offset press, 80,000 good impressions were obtained which increased by 55% with baking.

EXAMPLE 17

A coating solution was prepared, having the following composition:
16 pbw of a diazo compound as described in Example 1 of EP-A-30862,
8 pbw of the polymer produced in Example 7,
0.8 pbw of Victoria Pure Blue BO dye,
0.6 pbw of 85% phosphoric acid, and
1000 pbw of Ethylene glycol monomethyl ether.

The filtered solution was applied to an aluminium sheet as in Example 12 to give a dry coating weight of 0.82 gm$^{-2}$. After treatment, as in Example 12 (exposure, development and baking as appropriate) printing plates were obtained. When used on a rotary web offset press, 70,000 good impressions were obtained, which increased by 40% with baking.

EXAMPLE 18

A printing plate was prepared according to the recipe and method given in Example 12, but the polymer (of Example 1) was replaced by an equal weight of the polymer from Example 11. A dried coating weight of 0.84 gm$^{-2}$ was observed.

The development and steP-wedge characteristics were essentially indistinguishable from those of Example 12 and on a printing press 150,000 good copies were obtained.

On baking an identical plate by the method previously described and testing under the same process conditions, the same number of good copies were obtained, i.e. there was no improvement achieved through the baking process.

EXAMPLE 19

A coating solution, having the following composition was prepared:
12 pbw of a urethane acrylate disclosed as prepolymer A in Example 1 of Ep-A-0260823
4 pbw of the polymer produced in Example 1
0.6 pbw of 2-(4'-trichloromethylphenacylidene)-1,3,3-trimethyl 5-chloroindoline
2 pbw of the diazo compound (41) described in EP-A 0030862
0.4 pbw of Sudan Yellow and
1000 pbw of ethylene glycol monomethyl ether The filtered solution was applied to an aluminium sheet as in Example 12 to give a dry coating weight of 0.85 gm$^{-2}$. After treatment as in Example 12 (exposure, development and baking as appropriate) printing plates were obtained. When used on a rotary web offset press, 100,000 good impressions were obtained for the unbaked plate. The baked plate demonstrated significantly improved performance and gave a run length of 200,000 good impressions.

The whole experiment was repeated using, in place of the polymer produced in Example 1, 4 pbw of the polymer (non-bakeable) produced in Example 11. In this instance an improvement in performance on baking was again noted (due presumably to the use of the photopolymerisable urethane acrylate) but the degree of improvement was not as great as when the bakeable polymer of Example 1 was used.

EXAMPLE 20

A coating solution in methyl ethyl ketone comprising:
2 pbw of the dimethacrylate ester of the diglycidyl ether of Bisphenol A;
4 pbw of the polymer produced in Example 1;
0.6 pbw of 2(4'-chlorophenyl)-4,6-bis (trichloromethyl)-s-triazine; and
0.6 pbw of ethyl Michler's ketone,
was whirler coated onto a sheet of electrochemically grained and anodised aluminium and dried to form a radiation sensitive plate. The coating weight was 1.0 gm$^{-2}$. The dried coating was overcoated with poly(vinyl alcohol) to prevent oxygen inhibition.

After treatment as in Example 12 (exposure, development and baking as appropriate) printing plates were obtained. When used on a rotary web offset press, 150,000 good impressions were obtained for the unbaked plate. The baked plate demonstrated significantly improved performance and gave a run length of 250,000 good impressions.

The whole experiment was repeated using, in place of the polymer produced in Example 1, 4 pbw of the polymer (non-bakeable) produced in Example 11. In this instance an improvement in Performance on baking was again noted but the degree of improvement was not as great as when the bakeable polymer of Example 1 was used.

We claim:

1. A bakeable Polymer comprising groups of the formula

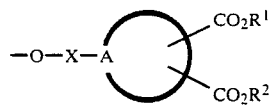

attached to carbon atoms which are part of the backbone of a polymer containing hydroxyl and optionally epoxide groups where, X is

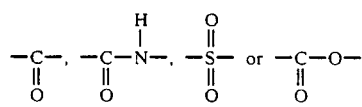

A is a moiety made up of sufficient carbon atoms to form a ring or fused ring system, and $R^1$ and $R^2$ are H or lower alkyl, provided that at least one of $R^1$ and $R^2$ is H, the groups containing $R^1$ and $R^2$ being oriented relative to one another on the ring system such that intramolecular anhydride formation can occur through heating.

2. A bakeable polymer as claimed in claim 1 wherein A is a benzene ring system and the groups containing $R^1$ and $R^2$ are adjacent each other.

3. A bakeable polymer as claimed in claim 1 wherein A is a naphthalene ring system and the groups containing $R^1$ and $R^2$ are located peri to each other.

4. A bakeable polymer as claimed in claim 1 wherein the polymer containing hydroxyl, and optionally epoxide, groups is an at least partially saponified polymer of vinyl acetate or an ester or acetal derivative of such a polymer, an epoxy resin, a poly (meth) acrylate ester, a copolymer containing free hydroxyl groups, a novolak resin, or a polymer derived from a vinyl phenol.

5. A bakeable polymer as claimed in claim 1 wherein the polymer containing hydroxyl, and optionally epoxide, groups additionally contains ester groups derived from aliphatic or aromatic carboxylic acids.

6. A radiation sensitive composition comprising a radiation sensitive compound and a bakeable polymer as claimed in claim 1.

7. A radiation sensitive composition as claimed in claim 6 wherein the radiation sensitive compound is a diazo compound.

8. A process for the production of a bakeable polymer which comprises
(i) providing a polymer containing a plurality of hydroxyl and optionally epoxide groups,
(ii) reacting some of the hydroxyl groups (and/or epoxide groups if present) with a reagent containing both a cyclic anhydride group and a further functional group, which further functional group is capable of reacting with said hydroxyl groups (and/or epoxide groups if present) preferentially relative to the anhydride group, and
(iii) changing the anhydride groups in a conversion step to carboxylic acid groups or to a carboxylic acid group and an ester group.

9. A process according to claim 8 wherein the further functional group is an isocyanate, a carboxylic acid or derivative thereof, a sulphonic acid or derivative thereof, or a chloroformate.

10. A process according to claim 8 wherein said reagent is
3-isocyanato phthalic acid anhydride;
4-isocyanato phthalic acid anhydride;
trimellitic acid anhydride chloride;
4-chlorosulphonyl 1,8, naphthalic acid anhydride; or
the Diels-Alder reaction product of sorbic acid and maleic acid anhydride.

11. A process according to claim 8, wherein the conversion step is effected by the addition of water.

12. A process according to claim 8, wherein the conversion step is effected by the addition of a primary alcohol.

* * * * *

UNITED STATES PATENT AND TRADEMARK OFFICE
CERTIFICATE OF CORRECTION

PATENT NO. : 4,994,530

DATED : February 19, 1991

INVENTOR(S) : Terence Etherington, et. al.

It is certified that error appears in the above-identified patent and that said Letters Patent is hereby corrected as shown below:

Column 1, line 24, "decrease-the" should be --decrease the--

Column 3, line 29, "acId" should be --acid--

Column 3, lines 41-42, "particularlY" should be --particularly--

Column 3, line 43, "aiter" should be --after--

Column 3, line 60, after "function" delete --25--

Column 4, line 1, "vinYl" should be --vinyl--

Column 4, line 35, "cm3" should be --$cm^3$--

Column 4, line 41, "analYsis" should be --analysis--

Column 4, line 59, "EXAMpLE" should be --EXAMPLE--

Column 4, line 61, "cm3" should be --$cm^3$--

Column 4, line 63, "(lPA)" should be --(IPA)--

Column 5, line 11, "20°C. For" should be --20°C for--

Column 5, line 27, "0.1 8" should be --0.1 g--

Column 5, line 51, "anhydriede" should be --anhydride--

Column 5, line 55, "sirred" should be --stirred--

Column 6, line 8, "NMPl" should be --NMP--

UNITED STATES PATENT AND TRADEMARK OFFICE
CERTIFICATE OF CORRECTION

PATENT NO. : 4,994,530  Page 2 of 2
DATED : February 19, 1991
INVENTOR(S) : Terence Etherington, et. al.

It is certified that error appears in the above-identified patent and that said Letters Patent is hereby corrected as shown below:

Column 6, line 18, "lhe" should be --The--

Column 6, line 38, "lPA" should be --IPA--

Column 7, line 52, "8good" should be --good--

Column 8, line 57, "benzophenone-5sulphonic" should be --benzophenone-5-sulphonic"

Column 9, line 13, "Aiter" should be --After--

Column 9, line 25, "steP-wedge" should be --step-wedge--

Column 9, line 40, "Ep" should be --EP--

Column 10, line 1, "2" should be --12--

Column 10, line 22, "Performance" should be --performance--

Column 10, line 27, "Polymer" should be --polymer--

Signed and Sealed this

Twenty-ninth Day of December, 1992

*Attest:*

DOUGLAS B. COMER

*Attesting Officer*  *Acting Commissioner of Patents and Trademarks*